United States Patent [19]

Quaeck

[11] Patent Number: 5,310,044

[45] Date of Patent: May 10, 1994

[54] RECIPROCATING FLOOR CONVEYOR HAVING SLATS OF VARIED SIZE AND DRIVE SYSTEM THEREFOR

[76] Inventor: Manfred Quaeck, 1515 - 210th Ave. NE., Redmond, Wash. 98053

[21] Appl. No.: 125,770

[22] Filed: Sep. 24, 1993

[51] Int. Cl.⁵ ............................................. B65G 25/04
[52] U.S. Cl. .................................. 198/750; 414/525.1
[58] Field of Search ....................... 198/750; 414/525.1, 414/525.9

[56] References Cited

U.S. PATENT DOCUMENTS 4,856,645 8/1989 Hallstrom, Jr. ...................... 198/750
5,222,593 6/1993 Quaeck ................................... 198/750

Primary Examiner—D. Glenn Dayoan
Attorney, Agent, or Firm—Graybeal Jackson Haley & Johnson

[57] ABSTRACT

The reciprocating floor conveyor of the present invention includes a supporting frame, a plurality of base members on the supporting frame, a plurality of elongate, slidable slats mounted on the base members, and a drive mechanism for causing longitudinal reciprocative movement of the plurality of slats. The plurality of slats are divided in at least a first and second interleaved groups. Each slat is connected to the slats adjacent thereto through slidable engagement of the sides of the slats, and are supported by the base members such that the first group of slats is elevated a greater distance from the supporting frame than the second group of slats. Each slat group includes a timing slat having a surface area greater than the surface area of each of the remaining slats in the group. The timing slat coordinates reciprocation of the slats within that group. The drive system of the present invention moves all of the slat groups simultaneously in an extended, conveying direction and moves each of the slat groups sequentially in an opposite, retracted direction. The drive system includes a fluid source, fluid-driven cylinders which each cause reciprocation of a slat group, a direction valve for alternately extending and retracting the slat groups, and flow regulators which control fluid flow from the drive cylinders of a particular slat group to the fluid source when the slat groups are all extended to sequentially retract the slat groups.

34 Claims, 5 Drawing Sheets

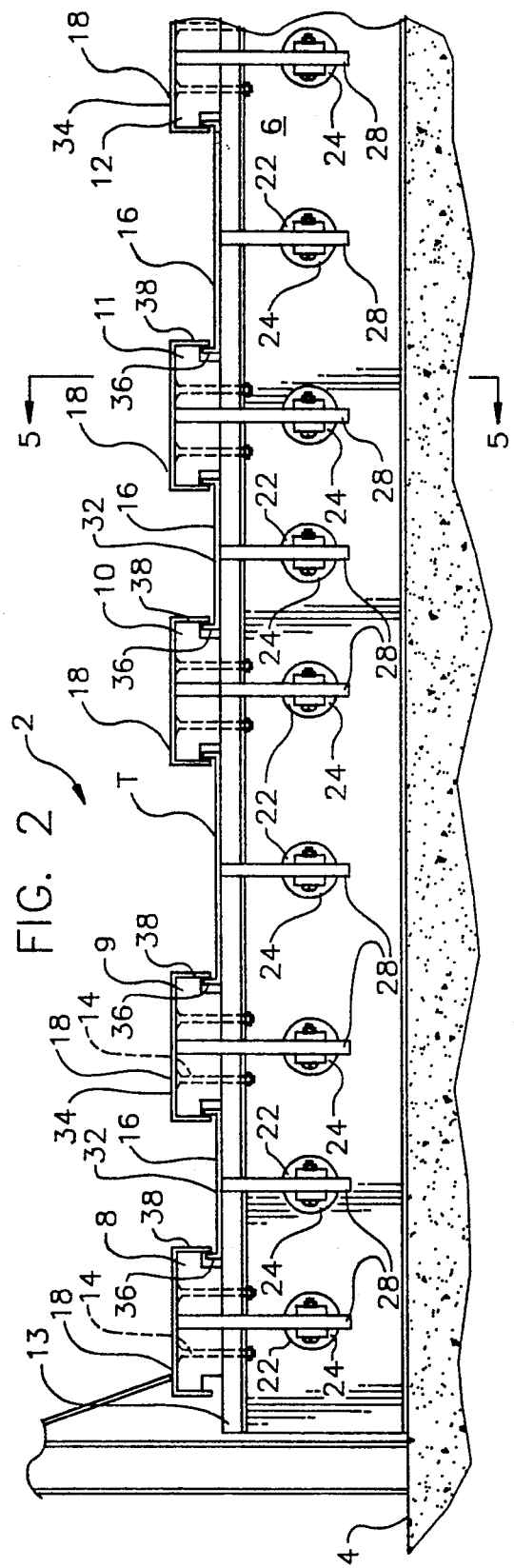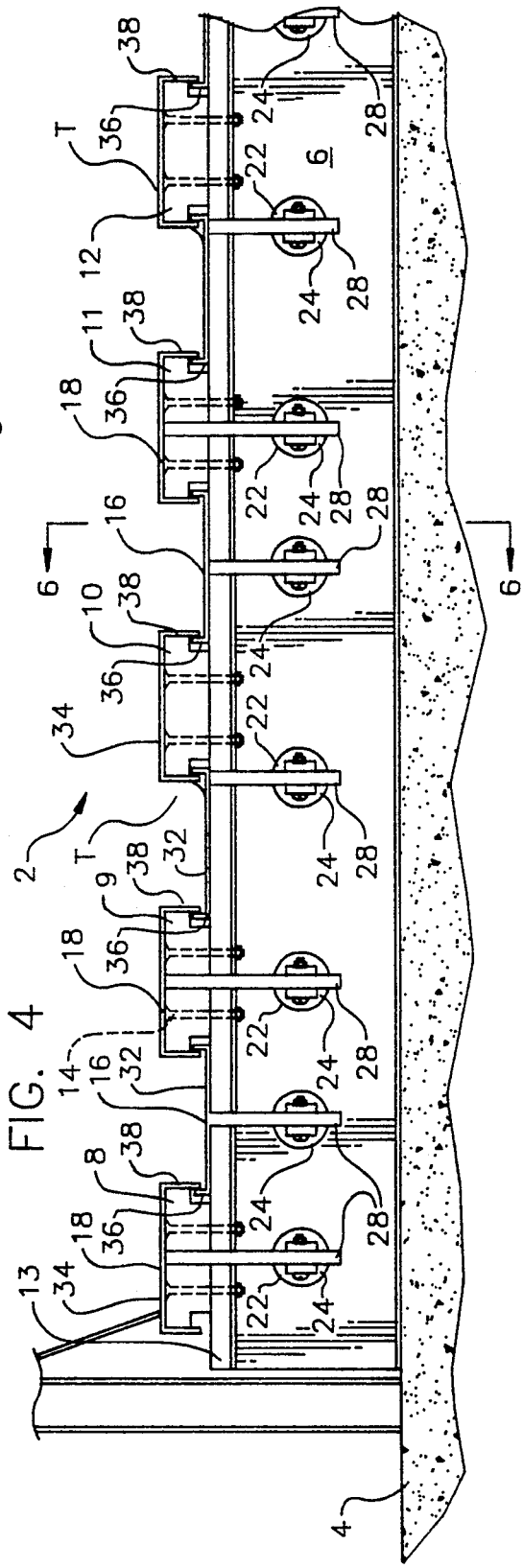

RECIPROCATING FLOOR CONVEYOR HAVING SLATS OF VARIED SIZE AND DRIVE SYSTEM THEREFOR

BACKGROUND OF THE INVENTION

The invention pertains to reciprocating conveyors, and more specifically, to reciprocating conveyors which provide sequential movement of a load thereon by simultaneous movement of all of the slats in the load conveying direction, and sequential return of the plurality of slat groups.

Reciprocating conveyors providing continuous movement are generally known in the art. U.S. Pat. No. 4,580,678, issued to Foster, discloses a reciprocating floor conveyor system in which a group of six floor slat members, staggered in a position relative to each other, are each first advanced and then sequentially returned such that five slats are moving forwardly while one slat moves in the return direction. The Foster reciprocating floor conveyor requires two separate sources of hydraulic pressure, one for advancing the floor slat members and another for retracting the floor slat members. This requirement for two separate hydraulic pressure sources increases the cost and complexity of the mechanism. The reciprocating floor conveyor of Foster does not provide hydraulic flow of a constant rate, regardless of flow pressure, to each individual slat. Thus, if some slats experience a greater load than others, the slats experiencing this greater load will move a lesser distance than the slats experiencing a lesser load, or not at all, and the sequential advance of the slats will be disrupted due to this lack of substantially constant flow rate in the respective hydraulic lines.

U.S. Pat. No. 4,144,963, issued to Hallstrom, discloses a reciprocating conveyor in which at least three elongate slats are employed such that there are always a greater number of slats moving simultaneously in a conveying direction than the number of slats moving in the opposite direction. In order to achieve the above slat movement, the Hallstrom patent requires a complex fluid pressure control valve having relatively movable first and second valve members. The first valve member has a plurality of first passageways each communicating with a different extensible fluid pressure cylinder. The second valve member has a common second passageway communicating simultaneously with more than half of the first passageways, and a third passageway communicating with the remaining first passageway. One of the first valve member and the second valve member is moved relative to the other to communicate the second and third passageway selectively with different ones of the first passageways. In addition to the above unduly complex fluid pressure control valve, the Hallstrom patent is also limited by the fact that, like the above Foster patent, substantially constant flow rate, regardless of flow pressure, is not provided. Thus, as stated above, the presence of unequal loads on respective slats will cause disproportionate slat movement resulting in disruption of the slat sequence.

U.S. Pat. No. 3,534,875 discloses a slat conveyor having three groups of slats, two of which move simultaneously in a load-conveying direction, while at the same time, the third group moves in the opposite direction to provide continuous movement.

In U.S. Pat. Nos. 4,143,760 and 4,611,708, three groups of slats all move simultaneously in a first load conveying direction and then each individual group moves sequentially in the opposite direction to cause sequential load movement. U.S. Pat. No. 4,856,645 teaches a slat conveyor having a group of non-moving "dead" slats spaced between two groups of slats that move simultaneously in a load conveying first direction and sequentially in an opposite direction for sequential load movement.

U.S. Pat. No. 4,157,761 discloses a discharge mechanism for discharging particulate loads that includes first and second stoker rods each having a plurality of cross bars. A fixed floor angle is located between each of the cross bars. The first and second stoker rods reciprocate lengthwise, rapidly, and, at the same time but out of phase.

U.S. Pat. Nos. 4,492,303; 4,679,686; 4,749,075; and 4,785,929 all issued to Foster disclose various components for reciprocating floor conveyors including hold-down members, bearing systems, and drive/guide systems.

U.S. Pat. No. 5,222,593 issued to Quaeck discloses a reciprocating floor conveyor in which a timing cylinder of smaller displacement coordinates the reciprocation of the slats. While this system functions well, the requirement for cylinders of two different sizes adds a degree of complexity.

A need thus exists for a reciprocating floor conveyor able to sequentially move heavy loads of, for example, one million pounds or more.

A need exists for the above type of reciprocating floor conveyor in which the slats are engaged, but slidable, to prevent passage of the particulate load matter therebetween.

A need exists for the above type of reciprocating floor conveyor in which adjacent slat members are oriented at different elevations above the conveyor floor to facilitate adjacent slat engagement.

A need exists for the above type of reciprocating floor conveyor in which each group of slat members is controlled by a separate timing slat that has a surface area larger than the other slat members in the group.

SUMMARY OF THE INVENTION

In accordance with the invention, a reciprocating floor conveyor is provided. The reciprocating floor conveyor includes a supporting frame, a plurality of base members on the supporting frame, a plurality of elongate, slidable slats mounted side by side on the base members, and drive means for causing longitudinal reciprocative movement of the plurality of slats. The plurality of slats are divided in at least a first group and a second group interleaved with the first group. The slats of the first group and of the second group are oriented such that each slat is connected to the slats adjacent thereto through slidable engagement of the sides of the slats. The slats are supported by the base members such that the first group of slats is elevated a greater distance from the supporting frame than the second group of slats.

In the preferred embodiment, the drive means is comprised of a plurality of drive cylinders, and each drive cylinder causes reciprocation of one, and only one, of the slats. Most preferably, the plurality of slats are substantially U-shaped in cross-section, and there is a T-shaped base member supporting alternate slats. One slat in each group has a greater surface area than the remainder of the slats in the group. Most preferably, this "timing" slat has a surface area between about 50 percent and about 100 percent greater than the surface area of each of the remaining slats.

The drive system for the reciprocating floor conveyor of the present invention is preferably employed wherein the reciprocating floor conveyor is comprised of at least three slat groups each having at least one slat member each. The drive system moves all of the slat groups substantially simultaneously in an extended, conveying direction and moves each of the slat groups sequentially in an opposite, retracted direction. The drive system includes a fluid source, at least three fluid-driven cylinders which each cause reciprocation of a slat group, a direction valve for alternately connecting the piston side and the rod side of the drive cylinders to fluid flow (i.e., for extending and retracting the slat groups), and first and second flow regulators which each control fluid flow from the drive cylinders of a particular slat group to the fluid source when the rod side of the drive cylinders is connected to fluid flow (i.e., when the slat groups are all extended) to sequentially retract the slat groups. The drive system also includes means for controlling the direction valve which moves the direction valve from its first position (in which fluid flows to the rod side of the drive cylinders) to its second position (in which fluid flows to the piston side of the drive cylinders) to extend the slat members after all of the slat members have retracted. The means for controlling the direction valve also moves the direction valve from its second position (in which fluid is provided to the piston side of the drive cylinders) to its first position (in which fluid is provided to the rod side of the drive cylinders) to retract the slat members after all of the slat members have extended.

The drive system also has a means for controlling the first flow regulator and second flow regulator which causes sequential retraction of the slat groups. After all of the slat members have been extended, the direction valve is then configured in its first position to allow retraction of the slats, and the first fluid regulator and the second fluid regulator are configured by the means for controlling the first flow regulator and second flow regulator to prevent fluid flow from their connected fluid drive cylinders to the fluid source. Thus, fluid only flows from the drive cylinders not connected thereto to the fluid source, resulting in retraction of the first slat group. The means for controlling the first flow regulator and second flow regulator then configures the first flow regulator such that fluid flows from the connected drive cylinders to the fluid pressure source resulting in retraction of the second slat group. Next, the means for controlling the first flow regulator and second flow regulator configures the second flow regulator such that fluid flows from the connected drive cylinders to the fluid source, resulting in retraction of the third slat group. Finally, the means for controlling the direction valve orients the direction valve in its second position to extend all of the now retracted slat members of the three slat groups. The means for controlling the direction valve then again orients the direction valve in its first position after slat extension and the above described sequential retraction of the slat groups occurs, as controlled by the means for controlling the first flow regulator and second flow regulator.

Preferably, a single larger "timing" slat is present for each slat group. The "timing" slats function such that the means for controlling the direction valve moves the direction valve from its first position, in which the rod side of the drive cylinders receive fluid flow, to its second position, in which the piston side of the drive cylinders receive fluid flow, to cause extension only upon retraction of the "timing" slat of the slat group that is sequentially the last to retract. Additionally, the "timing" slats function such that the means for controlling the direction valve moves the direction valve from its second position to its first position to cause retraction only upon extension of the last to extend of the simultaneously extending "timing" slats. These "timing" slats will always return from extension after the other slats in the currently retracting slat group because the "timing" slat, due to its larger surface area, carries more load while being powered by a cylinder that is the same displacement as the cylinders powering the other slats in the group.

BRIEF DESCRIPTION OF THE DRAWINGS

These and other features of the invention will be more fully appreciated when considered in light of the following specification and drawings in which:

FIG. 2 is an end view of a first embodiment of the reciprocating floor construction of the present invention;

FIG. 4 is a perspective view of a fragmentary portion of a second embodiment of the reciprocating floor construction of the present invention;

DETAILED DESCRIPTION OF THE PREFERRED EMBODIMENTS

Figure 1:
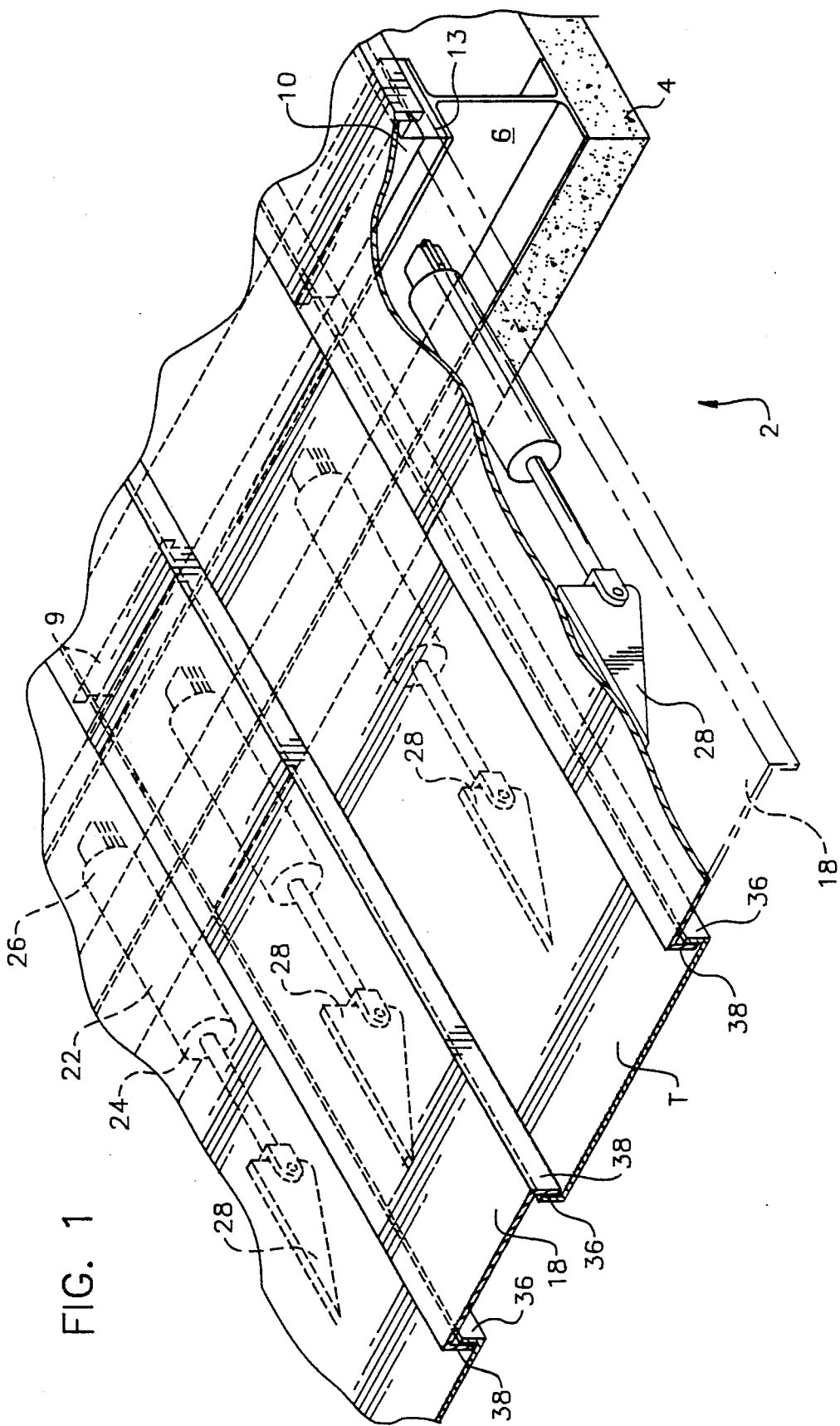
FIG. 1 is a perspective view of a fragmentary portion of a first embodiment of the reciprocating floor construction of the present invention.
Figure 3:
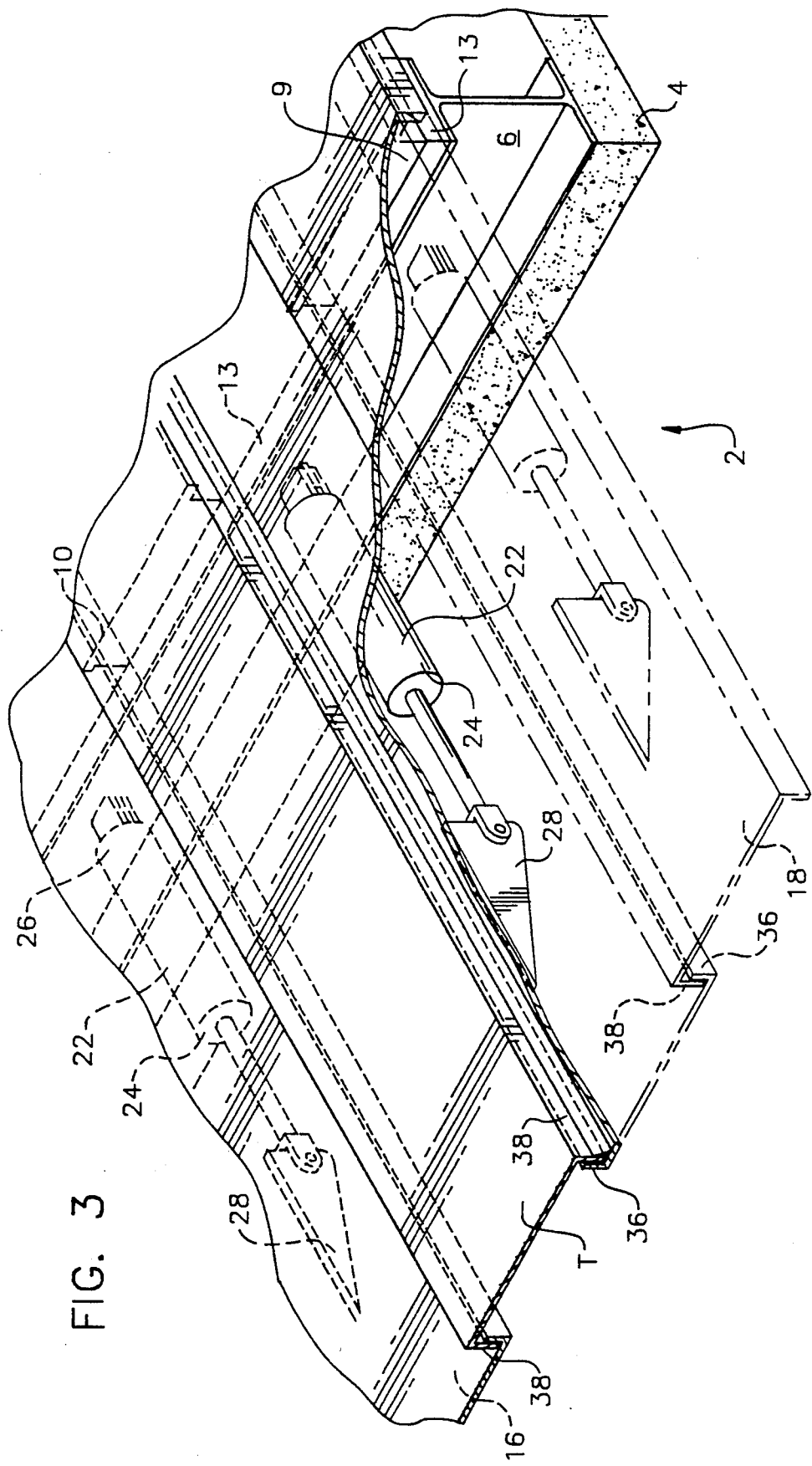
FIG. 3 is a side view of a first embodiment of the reciprocating floor construction of the present invention.

Referring to FIGS. 1 through 3 a first embodiment of the present invention is shown in which reciprocating conveyor 2 comprises a plurality of groups of elongated slats extending longitudinally in the direction of conveying movement and are oriented side-by-side. Reciprocating conveyor 2 resides on floor 4 and includes a plurality of transverse frame beams 6 which form a supporting frame. A plurality of base members 8, 9, 10, 11, and 12 are located on transverse frame beams 6. Base members 8, 9, 10, 11 and 12 are preferably T-shaped in cross-section and are most preferably comprised of an ultra high molecular weight polymer which allows base members 8, 9, 10 and 11 to function as bearings for the sliding reciprocation of slats located thereon. Most preferably, base members 8, 9, 10, 11 and 12 are located on longitudinal sheet 13, an elongate sheet of ultra high molecular weight polymer. Sheet 13 is longitudinally disposed along the top surfaces of transverse frame beams 6, with base members 8, 9, 10, 11 and 12 secured to transverse frame beams 6 with countersunk bolts 14 which pass through transverse frame beams 6 and sheet 13. Base members 8, 9, 10, 11 and 12 are most preferably located only on the portion of transverse frame beams 6 and sheet 13 which support either slats 16 or slats 18 in order to achieve a difference in elevation from floor 4 between slats 16 and slats 18. For slats 16 or 18, which are not located on elongate base members 8, 9, 10, 11 or 12, sheet 13 functions as a bearing and contacts these slats.

Three slats groups are shown, however, it is to be understood that more than three slat groups can be employed. Each of the slat groups contains at least one slat, however, any number of slats greater than one can also be employed. All of slats 16 and 18 are capable of independent longitudinal reciprocation.

The slat reciprocation is caused by a plurality of fluid-driven cylinders 22, with at least one fluid-driven cylinder 22 present for each slat group. Most preferably, a fluid-driven cylinder 22 is present for each and every of slats 16 and 18. Each fluid-driven cylinder includes a rod side 24 and a piston side 26 and pressurized hydraulic fluid is alternately fed into rod side 24 and piston side 26 to cause reciprocation of slats 16 and 18. More specifically, fluid flow into piston side 26 of fluid-driven cylinder 22 causes expansion of fluid-driven cylinder 22 and concomitant extension of slats 16 and 18 in the load conveying direction and passage of fluid into rod side 24 of fluid-driven cylinder 22 causes retraction of piston 22 and the associated retraction of slats 16 and 18 in the direction opposite to the direction of load conveyance. Fluid-driven cylinders 22 are preferably connected to slats 16 and 18 by slat flange 28 attached to slats 16 and 18, and are connected to transverse frame beam 6 by frame flange 30 attached to transverse frame beam 6.

Slat 16 has top 32 and sides 36, and slat 18 has top 34 and sides 38 such that slats 16 and 18 are preferably substantially U-shaped in cross section. Slats 16 and 18 are thus engaged, but individually slidable, through slidable engagement of a side 36 of slat 16 and a side 38 of slat 18. The aforesaid engagement of slats 16 and 18 prevent particulate matter of the load on top 32 of slat 16 and top 34 of slat 18 from either becoming trapped between or passing between the adjacent slats. In order to facilitate the above engagement of sides 36 of slat 16 and sides 38 of slat 18, 10, 11 and 12 are present under either slats 16 or slats 18, but are not present under both sets of slats.

Each separately reciprocable slat group comprising slats 16 and 18 include a "timing" slat T which has a surface area substantially larger than the surface area of the other slats 16 and 18 within that slat group. Preferably, the surface area of timing slat T is between about 50 percent and about 100 percent larger than the surface area of the remaining slats 16 and 18 in that slat group. The larger surface area of "timing" slats T ensures that each "timing" slat T will always return from extension after retraction of the other slats in the currently retracting slat group because the "timing" slats T, due to their larger surface area, carry more load while being powered by a cylinder 22 that is the same displacement as the cylinders 22 powering slats 16 and 18 in the group. Thus, the retraction of timing slats T can be employed to coordinate the reciprocation of the multiple slat groups.

Figure 5:
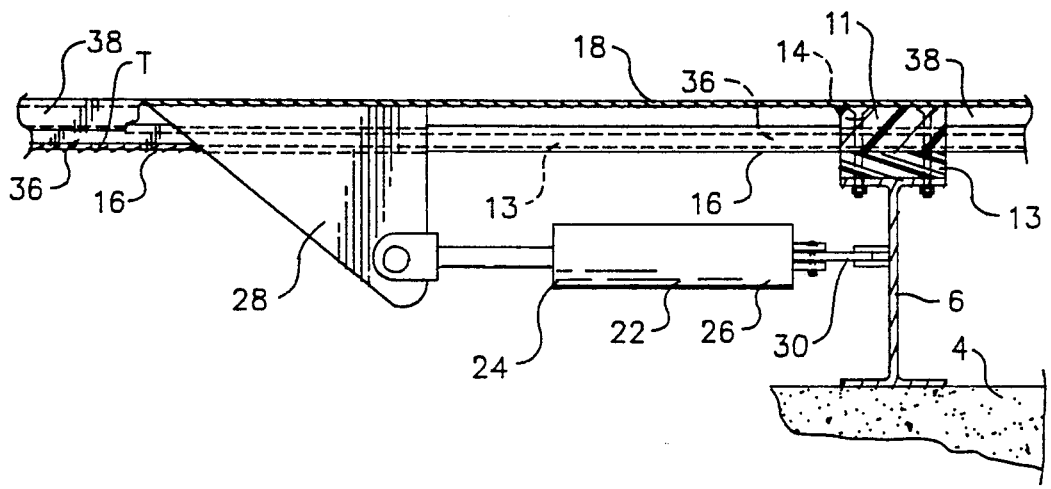
FIG. 5 is an end view of a second embodiment of the reciprocating floor construction of the present invention.
Figure 6:
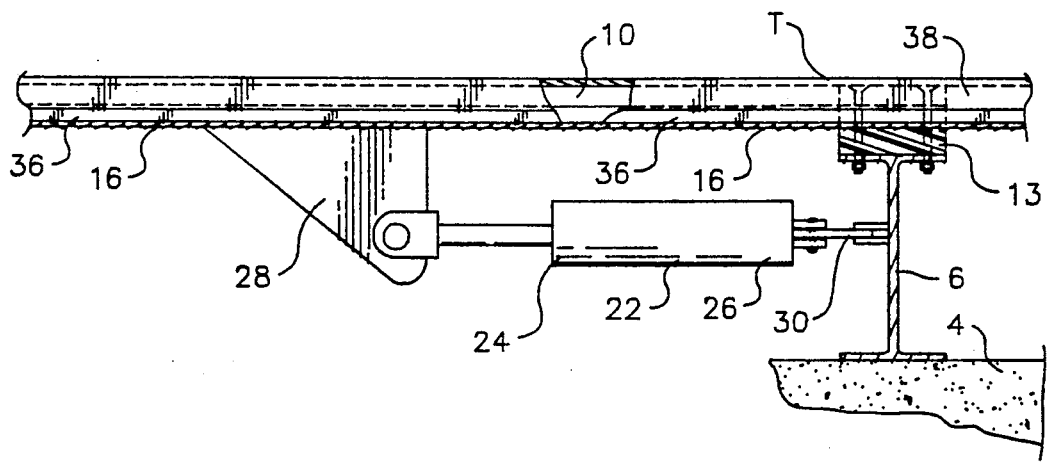
FIG. 6 is a side view of a second embodiment of the reciprocating floor construction of the present invention.

In the first embodiment of the present invention shown in FIGS. 1 through 3, "timing" slat T is a single U-shaped slat that is wider than slats 16 and 18. The second embodiment of the present invention, shown in FIGS. 4 through 6, is identical to the first embodiment except that the "timing" slat T is a single S-shaped slat comprised of two adjacent slats 16 and 18 of conventional size which have been securedly attached by, for example, welding.

Figure 7:
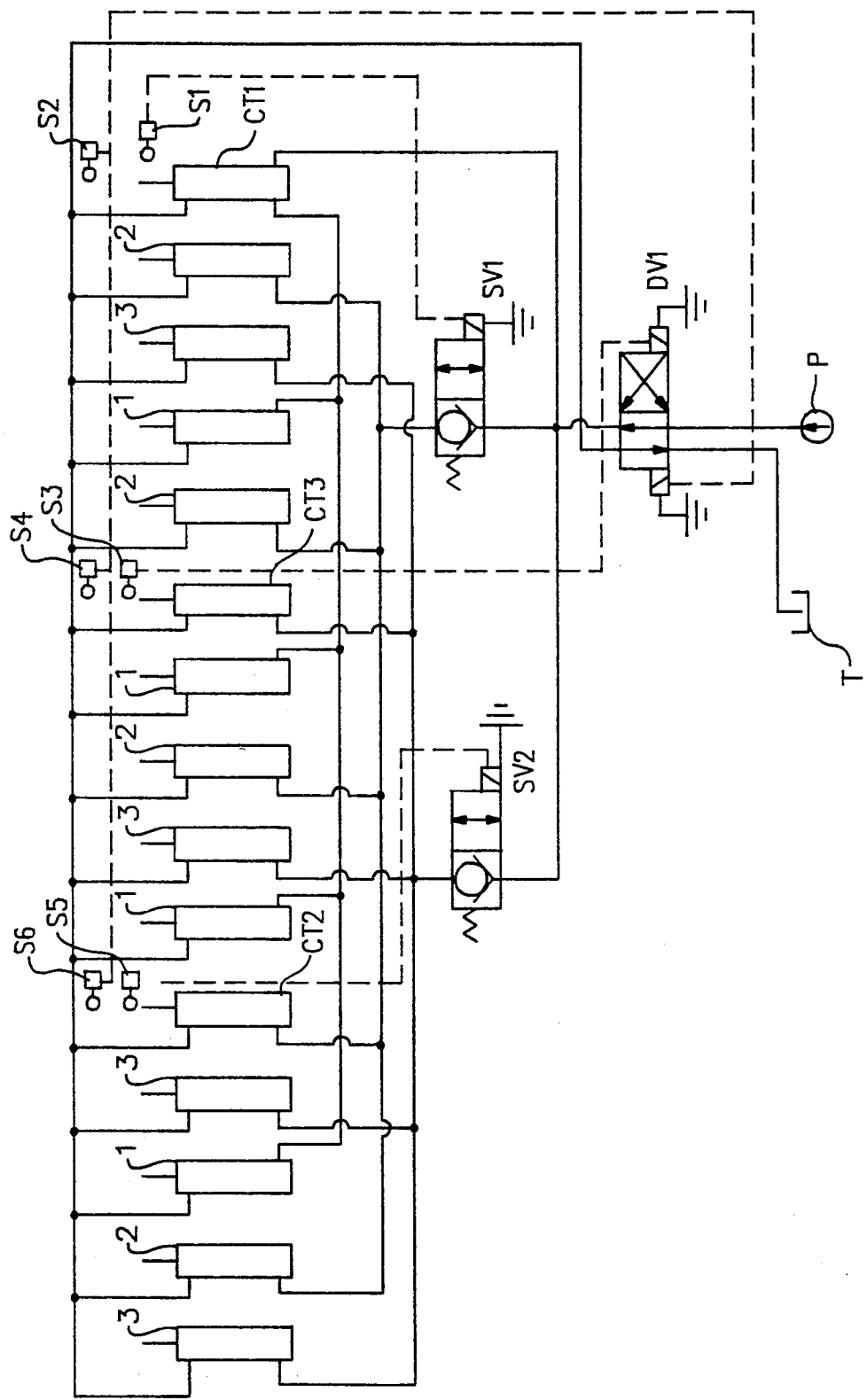
FIG. 7 is a schematic diagram of a fluid drive system employed with the present reciprocating floor in which three groups of slidable slats are employed, with each slat having a separate fluid-driven cylinder.

Referring now to FIG. 7, the fluid drive system employed with the present reciprocating floor conveyor 2 is described in which three groups of slidable slats are used, with each slat having a separate fluid-driven cylinder attached thereto. The fluid drive system preferably moves all of the slat groups simultaneously in an extended conveying direction and moves each of the slat groups sequentially in an opposite, retracted direction to cause load movement. Substantially equal distribution of the load on the slat groups provides substantially equal weight distribution on the slat groups. Thus, all of the slats of all of the groups generally extend simultaneously, and all of the slats within one slat group generally retract simultaneously. However, the above simultaneous extension of all slats of all slat groups and simultaneous retraction of all of the slats within one slat group is not critical (i.e., one or more slats carrying a greater load can lag) as long as the lagging slats do not extend or retract after the extension or retraction of the associated timing cylinder or cylinders, described below. Pump P, which is preferably a variable displacement pressure compensated pump designed to pump oil or other fluid, is connected to DV1, a two-position, four-way solenoid fluid directional valve. Also connected to DV1 is tank T which is a fluid reservoir well known in the art. DV1 has two fluid lines exiting therefrom. One fluid line connects tank T and pump P to the rod side of a plurality of fluid-driven cylinders divided into three groups, and designated cylinders 1, cylinders 2 and cylinders 3. Also communicating with tank T and pump P through DV1 are the rod sides of three fluid-driven cylinders CT1, CT2, and CT3. Each of cylinders CT1, CT2, and CT3 coordinate the reciprocation of the fluid-driven cylinders of a particular slat group because they are connected to the "timing" slat T for slat groups 1, 2 and 3, respectively. However, in displacement cylinders CT1, CT2 and CT3 are identical to cylinders 1, 2 and 3. For example, CT1 coordinates the reciprocation of fluid-driven cylinders 1 of the first slat group, cylinder CT2 coordinates the reciprocation of the fluid-driven cylinders 2 of the second slat group and cylinder CT3 coordinates the reciprocation of the fluid-driven cylinders 3 of the third group. Preferably, a number of "timing" slats T and associated cylinders CT equal to the number of slat groups are present. Due to their attachment to "timing" slats T, cylinders CT1, CT2 and CT3 all retract or extend after the retraction or extension of the respective cylinders 1, 2 or 3 associated with cylinders CT1, CT2 and CT3.

A second fluid outlet of DV1 connects pump P and tank T directly to the piston side of cylinder CT1 and cylinders 1 and indirectly to the piston side of cylinder CT2 and cylinders 2 through solenoid valve SV1, as well as indirectly to the piston sides of cylinders CT3 and cylinders 3 by solenoid valve SV2. Solenoid valves SV1 and SV2 allow free flow of fluid from pump P through DV1 and to the piston sides of the associated timing cylinders and drive cylinders of SV1 and SV2. However, SV1 and SV2 only allow fluid flow from the piston sides of their associated drive cylinders through DV1 and to tank T if SV1 or SV2 is configured in its open, not its closed, position. Solenoid valves SV1 and SV2 thus are flow regulators which regulate fluid flow through their associated fluid-driven cylinders.

Due to the above-described greater surface area of "timing" slats T connected to cylinders CT1, CT2, and CT3, extension or retraction of cylinders 1, 2 and/or 3 will occur before extension or retraction of cylinders CT1, CT2, and/or CT3 because of the greater load on "timing" slats T and the equal power of CT1, CT2 and CT3 when compared to cylinders 1, 2 and 3. More specifically, "timing" slats T and cylinder CT1, CT2, and CT3 function such that simultaneous extension, and preferably substantially simultaneous extension, of all of the slat groups occurs upon retraction of the "timing" slat T and associated cylinder CV1, CV2 or CV3 of the slat group that is sequentially the last to retract. Additionally, the function of "timing" slats T and of CV1, CV2 and CV3 is such that the slat groups sequentially retract only upon extension of the last to extend of the simultaneously extending "timing" slats T, preferably with all of the slats within a particular slat group retracting substantially simultaneously.

In preferable operation, simultaneous extension of the three slat groups occurs as fluid from pump P passes through DV1, which is configured such that fluid simultaneously passes to the piston side of all of cylinders 1, 2, and 3 and of all of cylinders CT1, CT2 and CT3 for simultaneous extension thereof. After the aforesaid simultaneous slat group extension, limit switches S2, S4, and S6, which are connected in a series, are switched by the extension of cylinder CT1, CT2, and CT3, respectively. The series connection of limit switches S2, S4, and S6 requires that all of cylinders CT1, CT2, and CT3, and, therefore, all cylinders 1, 2, and 3 extend before directional valve DV1 switches to allow fluid flow to the rod side of all cylinders 1, 2, and 3 and of all of cylinders CT1, CT2, and CT3. However, since solenoid valves SV1 and SV2 are initially in their closed configurations, fluid does not flow from the piston side of cylinders 2 and 3 and cylinders CT2 and CT3 to tank T when directional valve DV1 allows fluid to flow to the rod sides of all of the fluid-driven cylinders and timing cylinders; but instead fluid only flows from the piston side of cylinders 1 and cylinder CT1 to tank T to retract these cylinders and the associated first slat group. The retraction of cylinder CT1 as its "timing" slat T retracts actuates limit switch S1, which configures solenoid valve SV1 into its open position to allow fluid to flow from the piston side of cylinders 2 and cylinder CT2 to tank T to cause retraction of these cylinders and of the second slat group. Retraction of cylinder CT2 as its "timing" slat T actuates the limit switch S5 which configures solenoid valve SV2 in its open position to allow fluid to flow from the piston side of cylinder 3 and of cylinder CT3 to tank T to retract the cylinders and the third slat group. Retraction of cylinder CT3 as its "timing" slat T retracts actuates limit switch S3 which configures directional valve DV1 for fluid from pump P to flow to the piston side of all cylinders 1, 2, and 3 and cylinders CT1, CT2, and CT3 for simultaneous extension of the now all-retracted three slat groups and associated cylinders. After the extension of cylinders 1, 2, and 3 and cylinder CT1, CT2, and CT3, limit switches 2, 4, and 6 are again actuated and directional valve DV1 is configured to allow fluid flow to the rod side of cylinders 1, 2, and 3 and of cylinders CT1, CT2, and CT3 for sequential retraction of the three slat groups based upon the above-described sequential configuration of solenoid SV1 and SV2.

While preferred embodiments of the invention have been illustrated and described it will be appreciated that various changes can be made therein without departing from the spirit and scope of the invention.

I claim:

1. A reciprocating floor construction comprising:
   a supporting frame;
   a plurality of base means on said supporting frame;
   a plurality of elongated, slidable slats mounted side-by-side and divided into at least a first group and a second group interleaved with said first group, at least one of said slats in each of said first group and said second group having a surface area greater than the surface area of each of the remainder of said slats in said first group and said second group; and
   drive means for causing longitudinal reciprocative movement of said plurality of slats.

2. The floor construction of claim 1 wherein each of said slats has a top and two sides, each of said slats of said first group being connected to said slats of said second group adjacent thereto through slidable engagement of said sides of said slats.

3. The floor construction of claim 1 wherein said drive means engages each of said slats and is operable to move all of said slat groups simultaneously in an extended conveying direction and to move each of said slat groups sequentially in an opposite, retracted direction, said drive means including cylinders causing reciprocation of said slat groups and means for controlling extension and retraction of said cylinders based upon extension and retraction of said slat in each of said slat groups having a surface area greater than the surface area of each of the remainder of said slats in each slat group.

4. The floor construction of claim 1 wherein each of said slats having a greater surface area has a surface area between about 50 percent and about 100 percent greater than the surface area of each of the remainder of said slats in each slat group.

5. The floor construction of claim 1 further comprising bearing means between each of said base means and said slats.

6. The floor construction of claim 1 wherein all of said slats are substantially U-shaped in cross-section.

7. The floor construction of claim 1 wherein said slats having a greater surface area are substantially S-shaped in cross-section and the remainder of said slats in each slat group are substantially U-shaped in cross-section.

8. The floor construction of claim 1 wherein said base means comprises raised members under alternate ones of said slats and oriented parallel with said slats.

9. The floor construction of claim 8 wherein said base means are substantially T-shaped in cross-section.

10. The floor construction of claim 9 wherein said slats are substantially U-shaped in cross-section and have a top and two sides, at least one of said slats adapted to fit over said T-shaped base means whereby one of said sides of a slat adjacent to said slat on said T-shaped base means is retained between one of said sides of said slat on said T-shaped base means and said T-shaped base means.

11. The floor construction of claim 1 wherein said drive means is comprised of a separate drive cylinder attached to each of said slats.

12. The floor construction of claim 1 wherein 3 groups of slats are present.

13. A reciprocating floor construction comprising:
   a supporting frame;
   a plurality of base means on said supporting frame;

a plurality of elongated, slidable slats mounted side-by-side and divided into at least a first group and a second group interleaved with said first group, said slats each having a top and two sides, at least one of said slats in each of said first group and said second group having a surface area greater than the surface area of each of the remainder of said slats in said first group and said second group, each of said slats of said first group being connected to said slats of said second group adjacent thereto through slidable engagement of said sides of said slats; and drive means for causing longitudinal reciprocative movement of said plurality of slats.

14. The floor construction of claim 13 wherein said drive means engages each of said slats and is operable to move all of said slat groups simultaneously in an extended conveying direction and to move each of said slat groups sequentially in an opposite, retracted direction, said drive means including cylinders causing reciprocation of said slat groups and means for controlling extension and retraction of said cylinders based upon extension and retraction of said slat in each of said slat groups having a surface area greater than the surface area of each of the remainder of said slats in each slat group.

15. The floor construction of claim 13 wherein each of said slats having a greater surface area has a surface area between about 50 percent and about 100 percent greater than the surface area of the remainder of said slats in each slat group.

16. The floor construction of claim 13 further comprising bearing means between each of said base means and said slats.

17. The floor construction of claim 13 wherein all of said slats are substantially U-shaped in cross-section.

18. The floor construction of claim 13 wherein said slats having a greater surface area are substantially S-shaped in cross-section and the remainder of said slats in each slat group are substantially U-shaped in cross-section.

19. The floor construction of claim 13 wherein said base means comprises raised members under alternate ones of said slats and oriented parallel with said slats.

20. The floor construction of claim 19 wherein said base means are substantially T-shaped in cross-section.

21. The floor construction of claim 20 wherein said slats are substantially U-shaped in cross-section and have a top and two sides, at least one of said slats adapted to fit over said T-shaped base means whereby one of said sides of a slat adjacent to said slat on said T-shaped base means is retained between one of said sides of said slat on said T-shaped base means and said T-shaped base means.

22. The floor construction of claim 13 wherein said drive means is comprised of a separate drive cylinder attached to each of said slats.

23. The floor construction of claim 13 wherein 3 groups of slats are present.

24. A reciprocating floor construction comprising:
a supporting frame;
a plurality of base means on said supporting frame;
a plurality of elongated, slidable slats mounted side-by-side and divided into at least a first group and a second group interleaved with said first group, at least one of said slats in each of said first group and said second group having a surface area greater than the surface area of each of the remainder of said slats in said first group and said second group; and drive means for engaging each of said slats and operable to move all of said slat groups substantially simultaneously in an extended, conveying direction and to move each of said slat groups sequentially in an opposite, retracted direction, said drive means including cylinders causing reciprocation of said slat groups and means for controlling extension and retraction of said cylinders based upon extension and retraction of said slat in each of said slat groups having a surface area greater than the surface area of each of the remainder of said slats in each slat group.

25. The floor construction of claim 24 wherein each of said slats has a top and two sides, each of said slats of said first group being connected to said slats of said second group adjacent thereto through slidable engagement of said sides of said slats.

26. The floor construction of claim 24 wherein each of said slats having a greater surface area has a surface area between about 50 percent and about 100 percent greater than the surface area of each of the remainder of said slats in each slat group.

27. The floor construction of claim 24 further comprising bearing means between each of said base means and said slats.

28. The floor construction of claim 24 wherein all of said slats are substantially U-shaped in cross-section.

29. The floor construction of claim 24 wherein said slats having a greater surface area are substantially S-shaped in cross-section and the remainder of said slats in each slat group are substantially U-shaped in cross-section.

30. The floor construction of claim 24 wherein said base means comprises raised members under alternate ones of said slats and oriented parallel with said slats.

31. The floor construction of claim 30 wherein said base means are substantially T-shaped in cross-section.

32. The floor construction of claim 31 wherein said slats are substantially U-shaped in cross-section and have a top and two sides, at least one of said slats adapted to fit over said T-shaped base means whereby one of said sides of a slat adjacent to said slat on said T-shaped base means is retained between one of said sides of said slat on said T-shaped base means and said T-shaped base means.

33. The floor construction of claim 24 wherein said drive means is comprised of a separate drive cylinder attached to each of said slats.

34. The floor construction of claim 24 wherein 3 groups of slats are present.

* * * * *